(12) United States Patent
Kim et al.

(10) Patent No.: US 8,307,441 B2
(45) Date of Patent: Nov. 6, 2012

(54) LOG-BASED TRACEBACK SYSTEM AND METHOD USING CENTROID DECOMPOSITION TECHNIQUE

(75) Inventors: Jong Hyun Kim, Daejeon (KR); Geon Lyang Kim, Daejeon (KR); Seon Gyoung Sohn, Daejeon (KR); Beom Hwan Chang, Daejeon (KR); Chi Yoon Jeong, Daejeon (KR); Jong Ho Ryu, Choongcheongnam-do (KR); Jung Chan Na, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 479 days.

(21) Appl. No.: 12/669,633

(22) PCT Filed: Nov. 21, 2007

(86) PCT No.: PCT/KR2007/005859
§ 371 (c)(1),
(2), (4) Date: Jan. 19, 2010

(87) PCT Pub. No.: WO2009/014283
PCT Pub. Date: Jan. 29, 2009

(65) Prior Publication Data
US 2010/0212013 A1    Aug. 19, 2010

(30) Foreign Application Priority Data
Jul. 20, 2007    (KR) .................. 10-2007-0073059

(51) Int. Cl.
*G06F 11/34*    (2006.01)

(52) U.S. Cl. ........................................ 726/23; 709/224

(58) Field of Classification Search ................ 726/9, 23, 726/26, 27, 28, 29; 713/224, 201, 212, 213, 713/220, 223; 709/204, 201, 220, 224, 227; 707/600, 607, 608, 609, 687, 821; 380/200, 380/201, 202, 293, 227
See application file for complete search history.

(56) References Cited

U.S. PATENT DOCUMENTS
2003/0149777 A1 *  8/2003  Adler ........................... 709/228
(Continued)

FOREIGN PATENT DOCUMENTS
JP    2007097128 A  *  4/2007
(Continued)

OTHER PUBLICATIONS
PCT International Search Report of International Application No. PCT/KR2007/005859.
(Continued)

*Primary Examiner* — Brandon Hoffman
*Assistant Examiner* — Nega Woldemariam
(74) *Attorney, Agent, or Firm* — Kile Park Goekjian Reed & McManus PLLC

(57) ABSTRACT

There are provided a system and method for tracing back an attacker by using centroid decomposition technique, the system including: a log data input module collecting log data of an intrusion alarm from an intrusion detection system; a centroid node detection module generating a shortest path tree by applying a shortest path algorithm to network router connection information collected by a network administration server, detecting a centroid node by applying centroid decomposition technique removing a leaf-node to the shortest path tree, and generating a centroid tree whose node of each level is the detected centroid node; and a traceback processing module requesting log data of a router matched with the node of each level of the centroid tree, and tracing back a router identical to the log data of the collected intrusion alarm as a router connected to a source of an attacker by comparing the log data of the router with the log data of the collected intrusion alarm. According to the system and method, an attacker causing a security intrusion event may be quickly detected, a load on the system is reduced, and a passage host exposed to a danger or having weaknesses may be easily recognized, thereby easily coping with an attack.

15 Claims, 7 Drawing Sheets

U.S. PATENT DOCUMENTS

| | | | |
|---|---|---|---|
| 2004/0093521 A1* | 5/2004 | Hamadeh et al. | 713/201 |
| 2005/0152286 A1* | 7/2005 | Betts et al. | 370/255 |
| 2005/0257263 A1* | 11/2005 | Keohane et al. | 726/22 |
| 2005/0278779 A1* | 12/2005 | Koppol et al. | 726/22 |
| 2006/0184690 A1* | 8/2006 | Milliken | 709/238 |
| 2007/0230482 A1* | 10/2007 | Shim et al. | 370/400 |
| 2008/0002725 A1* | 1/2008 | Alicherry et al. | 370/401 |
| 2008/0244739 A1* | 10/2008 | Liu et al. | 726/22 |
| 2009/0154375 A1* | 6/2009 | Coskun et al. | 370/254 |

FOREIGN PATENT DOCUMENTS

| | | | |
|---|---|---|---|
| JP | 2007141096 A | * | 6/2007 |
| JP | 2008103007 A | * | 5/2008 |
| KR | 1020030039732 A | | 5/2003 |

OTHER PUBLICATIONS

PCT Written Opinion of the International Search Authority of International Application No. PCT/KR2007/005859.

'On Intrusion Source Identification', Proceedings of the 2nd IASTED International Conference Communications, Internet and Information Technology, Nov. 17-19, 2003, pp. 7~12.

'An Attack Origin Detection Mechanism in IP Traceback using Marking Algorithm', Journal of the Korean Institute of Information Security and Cryptology, vol. 13, No. 1, 2003, pp. 19~26.

* cited by examiner

LOG-BASED TRACEBACK SYSTEM AND METHOD USING CENTROID DECOMPOSITION TECHNIQUE

TECHNICAL FIELD

The present invention relates to a system and method for tracing back an attacker by using centroid decomposition technique, and more particularly, to a traceback system and method capable of accurately detecting a real location of an attacker by applying centroid decomposition technique to log data of an intrusion alarm generated from an intrusion detection system and log data of a router where an attack packet passes through, collected from a network administration server.

The work related to the present invention was partly supported by the IT R&D program of MIC/IITA [2007-S-022-01, Title: The Development of Smart Monitoring and Tracing System against Cyber-attack in AII-IP Network].

BACKGROUND ART

As various hackings and cyber crimes using Internet are rapidly increased, traceback systems tracing a real location of a hacker have been developed as expediency for more security system for protect a system and a network.

Observing conventional traceback technologies, when an attacker attacks a certain system via several systems, an Internet Protocol (IP) address of a system where an intruder finally passes through is obtained by analyzing a system where an intrusion is detected and an IP address of a system previously passed is obtained by installing a traceback agent in the system of the IP address, thereby sequentially tracing back an intrusion path to search a source of the intruder.

However, in this case, when there are a lot of systems where the intruder passes through, a load on the traceback system may be heavy, it is difficult to manage the traceback agent as a number of traceback agents increases, and it requires a large amount of times and resources to trace the source of the attacker.

As another method, there is an agent transfer traceback method, which obtains attack packet information by analyzing log data of an attacked system by installing an agent in the attacked system.

According to this method, when an attacking system is one on n number of paths, intrusion paths of a network attacker may be traced by repeatedly performing a process of installing an agent in an attacked system and obtaining attack packet information by analyzing log data. Accordingly, this method also requires a large amount of times for the traceback process.

As another method, Korean Patent Application No. 10-2001-0070766 (entitled ATTACKER TRACEBACK METHOD BY USING EDGE ROUTER'S LOG INFORMATION IN THE INTERNET) discloses a method where log information on all of accessing packets is recorded in an edge router of each network, thereby enabling traceback with respect to the packet regardless of changing an IP address of an attacker. Also, since the log information recorded in a plurality of the edge routers should be analyzed, this method requires a large amount of times for traceback process.

DISCLOSURE OF INVENTION

Technical Problem

An aspect of the present invention provides a log-based attacker traceback system and method using centroid decomposition technique, the system and method capable of quickly and accurately detecting a real location of an attacker comparing log data of an intrusion alarm collected from an intrusion detection system on Internet network topology with log data of a router corresponding to a centroid node detected by applying centroid decomposition technique to connection information of a network router, collected from a network administration server.

Technical Solution

According to an aspect of the present invention, there is provided a log-based traceback system using centroid decomposition technique, the system including: a log data input module collecting log data of an intrusion alarm from an intrusion detection system; a centroid node detection module generating a shortest path tree by applying a shortest path algorithm to network router connection information collected by a network administration server, detecting a centroid node by applying centroid decomposition technique removing a leaf-node to the shortest path tree, and generating a centroid tree whose node of each level is the detected centroid node; and a traceback processing module requesting log data of a router matched with the node of each level of the centroid tree, and tracing back a router identical to the log data of the collected intrusion alarm as a router connected to a source of an attacker by comparing the log data of the router with the log data of the collected intrusion alarm.

The log data may include a source Internet Protocol (IP) address, a destination IP address, a source port number, a destination port number, a protocol, a service type, an input/output interface of a router, and data collection time.

The system may further include a traceback result database storing attack path information that is a result of tracing back the source of the attacker.

The system may further include a router control module extracting log data of the router matched with the node of each level of the centroid tree by remote-controlling the router and transferring the extracted log data to the traceback processing module.

The system may further include a media access control (MAC) address detection module detecting MAC addresses of hosts connected to the router connected to the source of the traced back attacker and transferring the detected MAC addresses to the traceback processing module.

According to another aspect of the present invention, there is provided a log-based traceback method using centroid decomposition technique, the method including: collecting log data of an intrusion alarm generated from an intrusion detection system and connection information of a network router where an attack packet pass through from a network administration server; generating a centroid tree where a centroid node that is detected by applying centroid decomposition technique of removing a leaf-node to the connection information of the network router where an attack packet passes through is a node for each level; comparing log data of the node for each level of the centroid tree with log data of the intrusion alarm collected from the intrusion detection system to search a router connected to a source of an attacker; and extracting an attack pattern from the log data of the router connected to the source of the attacker, searching an MAC address identical to the attack pattern, and tracing back the source of the attacker by requesting an IP address corresponding to the MAC address.

The generating a centroid tree where a centroid node that is detected by applying centroid decomposition technique of removing a leaf-node to the connection information of the network router where an attack packet passes through is a node for each level may include: generating a shortest path tree by applying a shortest path algorithm to the connection information of the network router where the attack packet passes through; and generating a centroid tree where a centroid node is detected by applying the centroid decomposition technique of removing the leaf-node of the shortest path tree is a node for each level.

The generating a centroid tree where a centroid node is detected by applying the centroid decomposition technique of removing the leaf-node of the shortest path tree is a node for each level may include: removing a low level leaf-node from the shortest path tree; repeatedly removing a leaf-node from the shortest path tree from which the low level leaf-node is removed, until only one node is left; determining the only one node finally left as a high level centroid node; repeatedly removing a leaf-node from a plurality of trees obtained by removing the high level centroid node from the shortest path tree until only one node is finally left; determining a plurality of nodes finally left in the plurality of trees as low level centroid nodes; and generating a centroid tree where the high level centorid node is a root and the low level centroid node is a low level node.

The comparing log data of the node for each level of the centroid tree with log data of the intrusion alarm collected from the intrusion detection system to search a router connected to a source of an attacker may include: querying log data of each node in an order of a high level of the centroid tree and from left to right in the same level and comparing the log data of the each node with log data of an intrusion path; determining whether a node is a leaf-node or not, when there is the node with log data identical to the log data of the intrusion path as a result of the comparing; and determining the node as the router connected to the source of the attacker when the node is the leaf-node as a result of the determining.

Advantageous Effects

According to the system and method, an attacker causing a security intrusion event may be quickly detected, a load on the system is reduced, and a passage host exposed to a danger or having weaknesses may be easily recognized, thereby easily coping with an attack.

Also, as a network increases in size, a source of an intruder is quickly traced back, thereby preventing recurrence of an accident and providing safe and reliable Internet services.

BEST MODE FOR CARRYING OUT THE INVENTION

Figure 1:
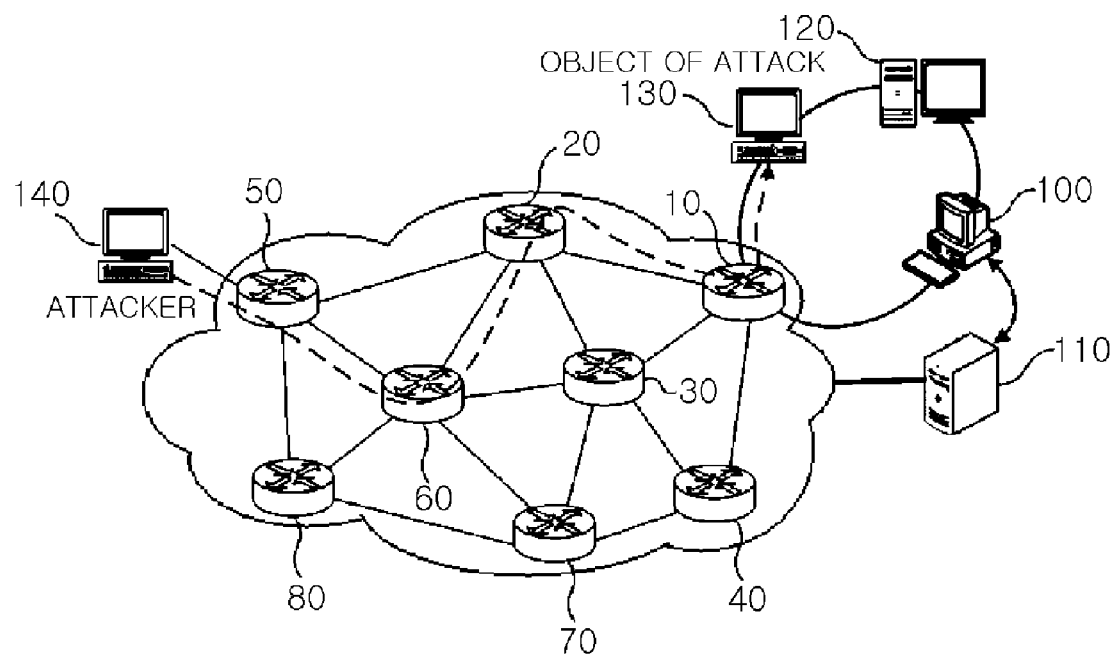
FIG. 1 is a configuration diagram illustrating a network including a log-based traceback system using centroid decomposition technique, according to an exemplary embodiment of the present invention.

Hereinafter, exemplary embodiments of the present invention will now be described in detail with reference to the accompanying drawings.

Only, in describing operations of the exemplary embodiments in detail, when it is considered that a detailed description on related well-known functions or constitutions unnecessarily may make essential points of the present invention be unclear, the detailed description will be omitted.

Also, in the drawings, the same reference numerals are used throughout to designate the same or similar components.

In addition, throughout the specification, when it is describe that a part is "connected to" another part, this includes not only a case of "being directly connected to" but also a case of "being electrically connected to" interposing another device therebetween.

Also, when it is described that an apparatus "includes" an element and there is no opposite description thereof, this is not designate that the apparatus excludes other elements but designates that the apparatus may further include other elements.

Also the term of "module" indicates a unit for processing a certain function or operation, which can be embodied by software, hardware, or a combination of software and hardware.

Before describing the present invention, the concept of terms related to the present invention will be defined as follows.

Centroid decomposition technique indicates technique where a leaf-node is repeatedly removed from a certain tree until one or two nodes are finally left. The leaf-node indicates a node having no descendant node in a tree.

A centroid node is one node finally left after performing the centroid decomposition technique.

A centroid node tree indicates a tree where the centroid node is a node for each level and there are levels of number of times of applying the centroid decomposition technique to generate the centroid tree from a certain tree.

FIG. 1 is a configuration diagram illustrating a network including a log-based traceback system 100 using centroid decomposition technique, according to an exemplary embodiment of the present invention.

Referring to FIG. 1, when a network attacker attacks a host 130 that is an object of an attack via routers 50→60→20→10 by using a system 140 of its own, an intrusion detection system 120 detects the attack and transmits log data on an attack packet of the attacker, that is, log data of an intrusion alarm to the tracbeck system 100.

The traceback system 100 receiving log data of an intrusion alarm from the intrusion detection system 120 collects connection information of a network router from a network administration server 110.

The traceback system 100 generates a centroid tree by using the connection information of the network router, collected from the network administration server 110 and compares log data of a router matched with a node of the centroid tree with the log data of the intrusion alarm received from the intrusion detection system 120, thereby tracing back a source of the attacker.

Figure 2:
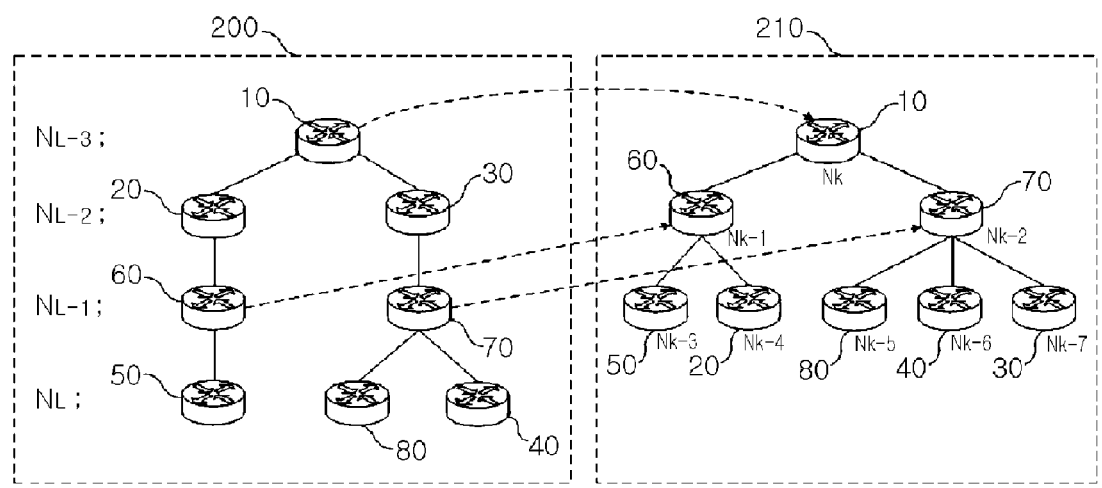
FIG. 2 is a diagram illustrating a theory of generating a centroid tree by using centroid decomposition technique, according to an exemplary embodiment of the present invention.

FIG. 2 is a diagram illustrating a centroid tree 210 generated by the traceback system 100 using the centroid decomposition technique, according to an exemplary embodiment of the present invention.

Referring to FIG. 2, the traceback system 100 generates a shortest path tree 200 by applying a shortest path algorithm to connection information of a network router, collected from the network administration server 110.

In this case, the shortest path algorithm is to calculate a shortest path to each node on overall topology, which is generally known algorithm such as Dijkstra algorithm.

A root on the shortest path tree 200 is a router 10 connected to the host 130 that is an object of the attack. The traceback system 100 searches a centroid node on the shortest path tree 200 by applying the centroid decomposition technique to the shortest path tree 200 and generates the centroid tree 210 where the centroid node becomes a node for each level.

Using the centroid tree 210, nodes present higher than the centroid node may be excluded from objects of search. Accordingly, there is no need to search all routers to trace a source of an attacker, thereby reducing an amount of time consumed for tracing back the source of the attacker.

In detail, a process of generating the centroid tree 210 by applying the centroid decomposition technique to the shortest path tree 200 is formed of a first process of searching a centroid node of a high level of a tree and a second process of searching centroid nodes of a low level of the tree.

In the first process, low level leaf-nodes 40, 50, and 80 are removed from the shortest path tree 200. Low level leaf-nodes 60 and 70 are removed from a shortest path tree where there are leaf-nodes 10, 20, 30, 60, and 70 are present except for the leaf-nodes 40, 50, and 80. The low level leaf-nodes 20 and 30 are removed from a shortest path tree where the leaf-nodes 10, 20, and 30 are present. That is, removing a leaf-node is repeated until there is finally left only one node in the shortest path tree 200.

As described above, the centroid decomposition technique of removing a leaf-node from a shortest path tree is repeatedly performed, and the one node 10 finally left becomes a centroid node, which is a high level node, that is, a root in the centroid tree 210.

In the second process, the centroid 10 searched in the first process is removed from the shortest path tree 200.

Then, there are generated two trees. One tree is formed of nodes 60, 50, and 20, and another tree is formed of nodes 70, 80, 40, and 30. When a low level leaf-node is repeatedly removed by applying the centroid decomposition technique to the two respective trees similar to the first process, there are left the two nodes 60 and 70.

The two left nodes 60 and 70 become centroid nodes of two trees after removing the root node 10, which become low level nodes of the root node 10.

Accordingly, there is generated the centroid tree 210 where the centroid node 10 searched in the first process is a root and the centroid nodes 60 and 70 searched in the second process are low level nodes.

Until all nodes in the shortest path tree 200 are embodied as the centroid tree 210, the second process is repeated. Times of repeating the second process becomes a number of levels of a centroid tree.

Figure 3:
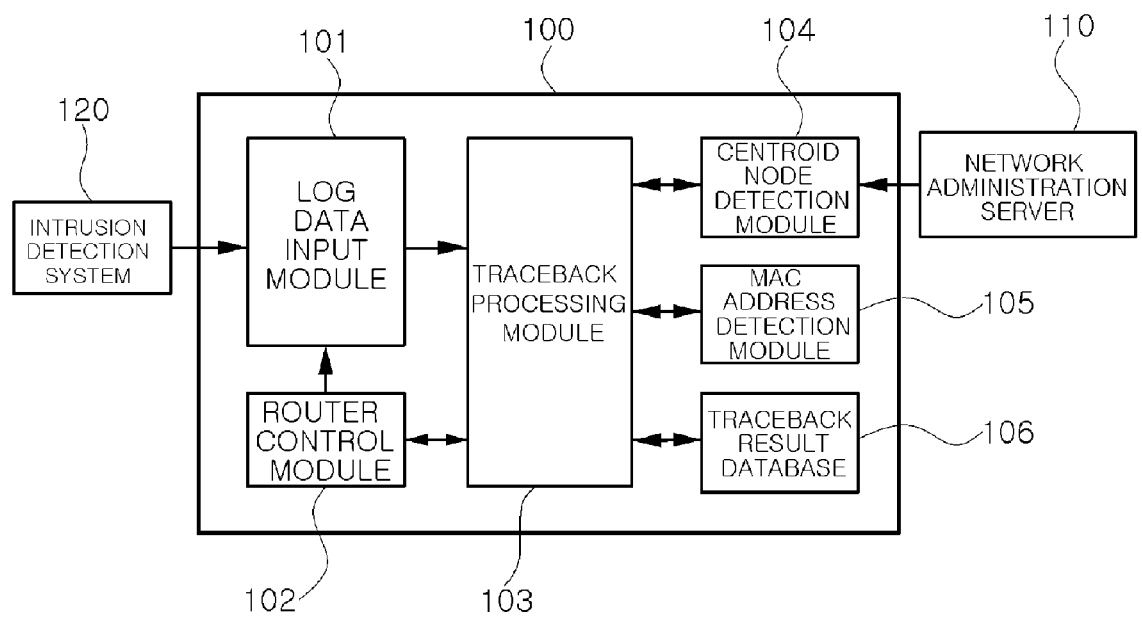
FIG. 3 is a detailed configuration diagram illustrating the log-based traceback system using centroid decomposition technique.

FIG. 3 is a detailed configuration diagram illustrating the log-based traceback system using the centroid decomposition technique.

Referring to FIG. 3, the traceback system 100 for tracing back a network attacker includes a log data input module 101, a router control module 102, a traceback processing module 103, a centroid node detection module 104, a media access control (MAC) address detection module 105, and a traceback result database 106.

The log data input module 101 collects log data on an intrusion alarm of the network attacker from an intrusion detection system 120, analyzes the collected log data of the intrusion alarm, and extracts and transfers necessary log data to the traceback processing module 103.

The log data includes a source Internet Protocol (IP) address, a destination IP address, a source port number, a destination port number, a protocol, a service type, an input/output interface of a router, and a point in time of collecting data.

When the log data of the intrusion alarm is inputted, the centroid node detection module 104 collects connection information of a network router from the network administration server 110 and generates a shortest path tree 200 whose root is a router connected to an attacked system. In addition, the centroid node detection module 104 searches centroid nodes of the network by repeatedly applying the centroid decomposition technique to the generated shortest path tree 200 and generates the centroid tree 210 where the centroid node becomes a node for each level. Then, the centroid node detection module 104 transfers information on the generated centroid tree 210 to the traceback processing module 103.

The traceback processing module 103 searches a node corresponding to the log data of the intrusion alarm from a root to a low level node in a top-down direction in the centroid tree 210 generated by the centroid node detection module 104.

Accordingly, the traceback processing module 103 inquires the router control module 102 log data of a router matched with each centroid node, compares the log data of the router matched with the centroid node, transferred by the router control module 102 in response to the inquiring, with the log data of the intrusion alarm, transferred from the log data input module 101, and traces back a router connected to a source of the network attacker.

Then, when a router having log data identical to the log data of the intrusion alarm is searched among the centroid nodes, that is, the router connected to the source of the network attacker is recognized, it is required to search what host generates attack traffic. Accordingly, the traceback processing module 103 requests the MAC address detection module 105 to transfer MAC addresses of hosts connected to the router connected to the source of the network attacker.

The traceback processing module 103 searches an MAC address identical to an attack pattern extracted from the log data of the router connected to the source of the network attacker, in the MAC addresses transferred from the MAC address detection module 105. A real IP address identical to the MAC address having the attack pattern searched via the process as described above is searched, thereby tracing a real attack system.

The router control module 102 extracts necessary log data by remote-controlling the router matched with the centroid node and the log data to the traceback processing module 103 in response to the inquiring of the traceback processing module 103.

The MAC address detection module 105 detects and transfers MAC addresses of all hosts connected to the router connected to the source of the network attacker, to the traceback processing module 103, in response to the request of the traceback processing module 103.

In the traceback result database 106, there is stored attack path information of routers, which is a result of a process of tracing back the source of the network attacker by the traceback processing module 103.

Figure 4:
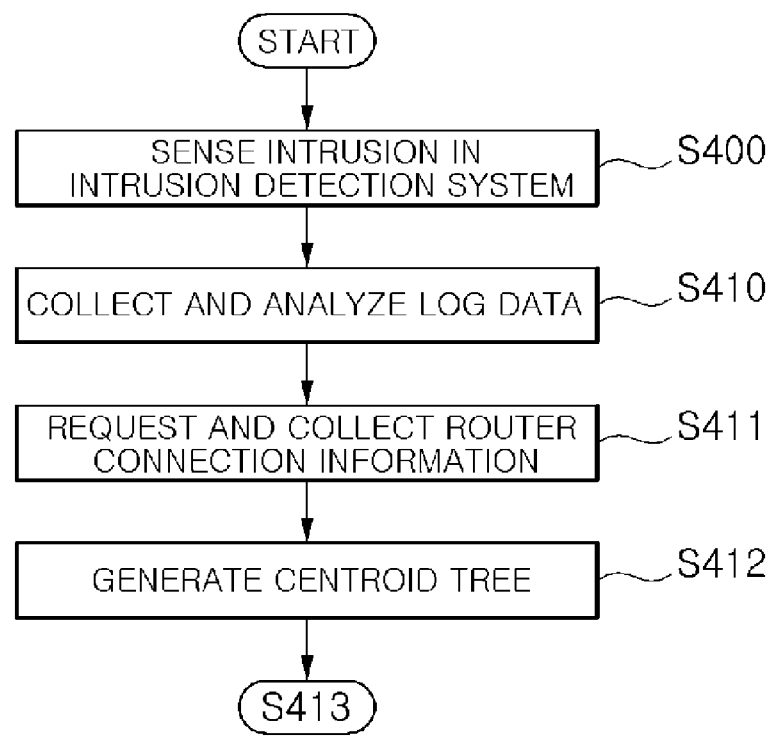
FIG. 4 is a flowchart illustrating a process of generating a centroid tree in a log-based traceback method using centroid decomposition technique according to an exemplary embodiment of the present invention.
Figure 5:
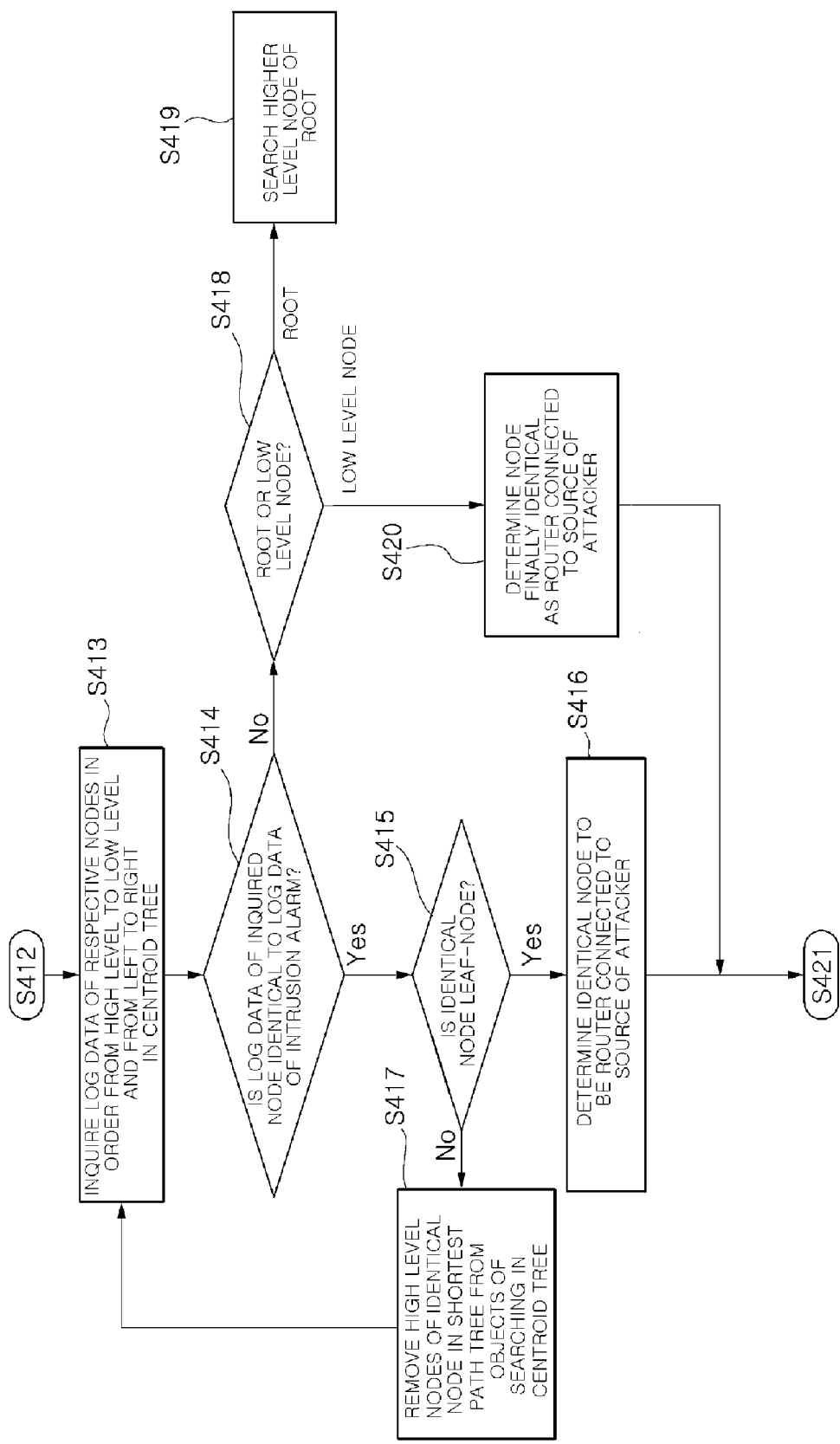
FIG. 5 is a flowchart illustrating a process of searching a node matched with a router connected to an attacker in the log-based traceback method using centroid decomposition technique.
Figure 6:
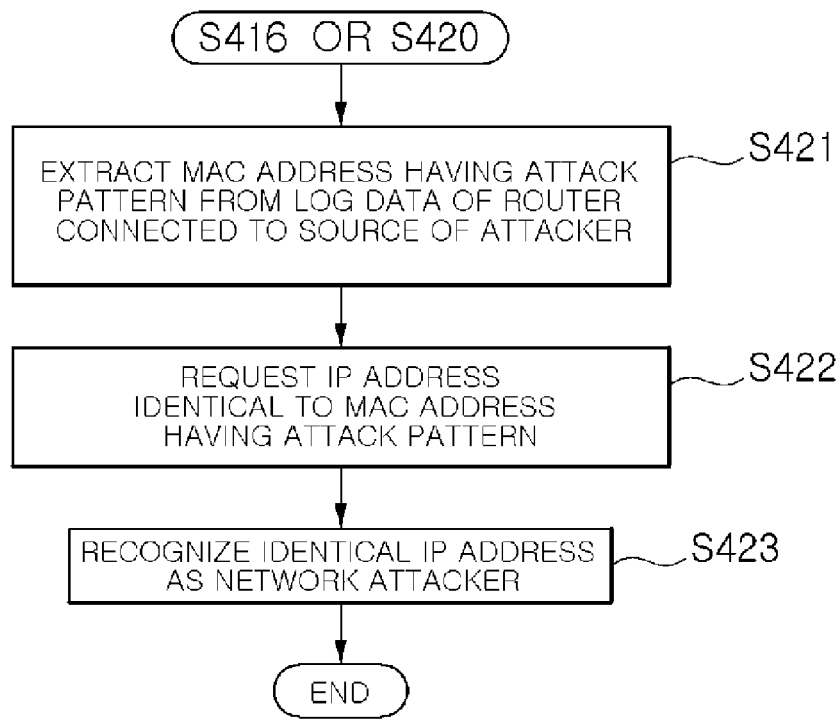
FIG. 6 is a flowchart illustrating a process of tracing back a source of the attacker in the log-based traceback method using centroid decomposition technique.

A traceback method performed by the traceback system 100 will be described with reference to FIGS. 4 to 6. FIGS. 4 to 6 are flowcharts illustrating a log-based traceback method using the centorid decomposition technique, according to an exemplary embodiment of the present invention.

The traceback method is formed of a process of generating a centroid tree, illustrated in FIG. 4, a process of searching a node corresponding to a router connected to an attacker, illustrated in FIG. 5, and a process of tracing a source of the attacker, illustrated in FIG. 6.

The process of generating the centorid tree will be described with reference to FIG. 4.

The intrusion detection system 120 senses and notifies an intrusion of an attacker with respect to the host 130 that is an object of an attack, to the traceback system 100 (S400).

In this case, the log data input module 101 collects log data of an intrusion alarm from the intrusion detection system 120 and analyzes necessary log data (S410), and the centroid node detection module 104 collects connection information of a network router from the network administration server 110 (S411).

Also, the centroid node detection module 104 generates a centroid tree by applying the centroid decomposition technique to the connection information of the network router, collected from the network administration server 110 (S412).

In a top-down way from a highest level to a lowest level in the generated centroid tree, respective nodes are given Nk, Nk-1, Nk-2, . . . and Nk-*n* one by one (shown in FIG. 2). The process of generating the centroid tree, which is illustrated in FIG. 2, will be described in detail with reference to FIG. 7.

The process of tracing back a node matched with a router connected to a source of the attacker will be described with reference to FIG. 5.

The traceback processing module 103 inquires the router control module 102 to analyze log data of respective nodes in an order from a high level to a low level of the centroid tree generated in S412 and from left to right in the same level (S413).

The traceback processing module 103 compares the log data of the node inquired in S413 with the log data of the intrusion alarm transferred from the intrusion detection system 120 (S414).

As a result of the comparing in S414, when the log data of the node is identical to the log data of the intrusion alarm, it is determined whether the node is a leaf-node (S415).

As a result of the determining in S415, when the node is a leaf-node, the node is determined to be a router connected to the source of the attacker (S416).

When the node is not a leaf-node, a node with a higher level than that of the node that has the identical log data but is not a leaf-node in the shortest path tree is removed from an object of searching the centroid tree (S417) and S413 is returned.

When S413 is returned, log data of respective nodes are inquired in an order from a high level to a low level and from left to right of nodes left in the centroid tree (S413).

As a result of the comparing in S414, when there is no node having the identical log data, it is checked whether the node is a root or a low level node (S418).

As a result of the checking in S418, when the node is a root, a node having a higher level than that of the root is searched (S419). When there is the higher level node, log data of the higher level node is compared with the log data of the intrusion.

As a result of the checking in S418, when the node is a low level node, the identical node finally detected is determined to be the router connected to the source of the attacker (S420).

Applying the network and the centroid tree illustrated in FIGS. 1 and 2 to the described process, log data of a node Nk: 10 of a high level in the centroid tree 210 of FIG. 2 is inquired and the log data of the node Nk is compared with the log data of the intrusion alarm.

As a result of the comparing, when the two log data are identical to each other and the node Nk: 10 is not a leaf-node, a higher level node of the node Nk: 10 should be excluded from the centroid tree 210. However, there is no higher level node of the node Nk: 10, log data of a node Nk-1: 60 that is a left node of a low level in the centroid tree excluding the node Nk: 10 is inquired to be compared with the log data of the intrusion alarm.

As a result of the comparing, when the node Nk-1: 60 has identical log data and is not a leaf-node, a higher level node Nk-4: 20 in the shortest path tree 200 is removed from the centroid tree 210.

Log data of a node Nk-3: 50 left in the centroid tree 210 is inquired to be compared with the log data of the intrusion alarm. As a result of the comparing, the log data of the node Nk-3: 50 is identical to the log data of the intrusion alarm and the node Nk-3: 50 is a leaf-node, the node Nk-3: 50 is determined to be a router connected to a source of the attacker.

In this case, when log data of both of the node Nk: 10 and the low level node Nk-1: 60 are identical to the log data of the intrusion alarm, a higher level router of a router corresponding to the node Nk-1: 60 in the shorted path tree 200, that is, the node Nk-4: 20 is excluded since the node 20 is present between the node 60 and the node 10 in the shortest path tree shown in FIG. 2 and is not required to be searched.

Accordingly, comparing the log data of the node Nk-4: 20 with the log data of the intrusion alarm is omitted and log data of a node Nk-3: 50 is inquired to be compared with the log data of the intrusion alarm.

Accordingly, according to the log-based traceback method using the centroid decomposition technique according to an exemplary embodiment of the present invention, it is possible to reduce a number of nodes to be searched, by tracing back an attack router by using the centroid tree 210 generated by applying the centroid decomposition technique and the shortest path tree 200, as illustrated in FIG. 5.

The process of tracing the source of the attacker will be described in detail with reference to FIG. 6.

When the router connected to the attacker is determined via S416 to 420, the traceback processing module 103 extracts an attack pattern from log data of the router connected to the attacker, matched with the node Nk-3: 50, (S421) and receives an MAC address corresponding to the attack pattern from the MAC address detection module 105.

An IP address identical to the MAC address having the attack pattern is requested (S422) and is recognized as the network attacker (S423).

Accordingly, according to the present invention, though an attacker changes an IP address thereof, a source of the attacker may be traced.

Figure 7:
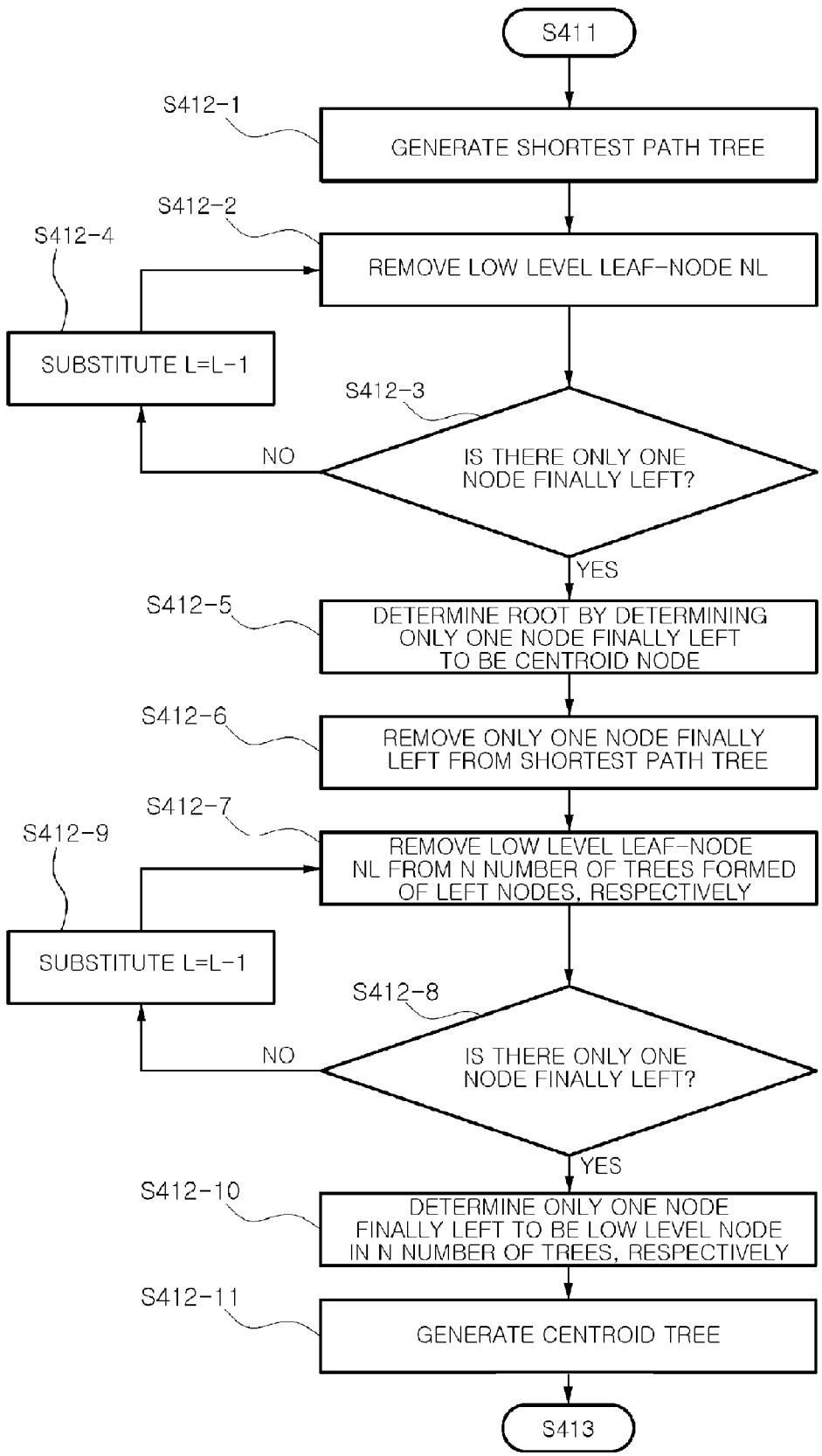
FIG. 7 is a flowchart illustrating a method of generating a centroid tree using centroid decomposition technique according to an exemplary embodiment of the present invention.

FIG. 7 is a flowchart illustrating the process of generating the centroid tree, illustrated in FIG. 4, in detail.

Referring to FIG. 7, when log data of an intrusion alarm is transferred from an intrusion detection system, the centroid node detection module 104 collects network router connection information from the network administration server 110 (S411).

The shortest path tree 200 where a source of a network attacker is connected to an object of an attack as shown in FIG. 2 is generated by driving a most general shortest path algorithm based on the collected network router connection information (S412-1).

A low level leaf-node NL that is a node present in a low level L in the generated shortest path tree 200 (S412-2).

It is checked whether there is only one node in the shortest path tree 200 (S412-3). When there is not only one node, a low level leaf-node of a level obtained by substituting L=L−1 (S412-4) is removed by repeating S412-2, S412-3, and S412-4 until only one node is finally left in a shortest path tree excluding the low level leaf-node NL.

Finally, when there is present only one node, the only one node becomes a centroid node of a high level (S412-5).

Then, the only one node finally left is removed from the shortest path tree 200 (S412-6).

A low leaf-node NL is removed from n number of trees formed of nodes not removed in S412-6, respectively, in which n is a certain natural number, (S412-7).

It is checked that whether there is only one node finally left in the n number of trees (S412-8). When there is not only one node, a low level leaf-node of a level obtained by substituting L=L−1 (S412-9) is removed by repeating S412-7, S412-8, and S412-9 until only one node is finally left in a shortest path tree excluding the low level leaf-node NL.

When there only one node is present in the n number of trees, the only one node is a centroid node of a low level (S412-10). That is, n number of centroid nodes are present in the n number of trees.

Accordingly, there is generated a centroid tree where the centroid node searched in S412-5 is a root and the centroid node searched in S412-10 is a low level node (S412-11).

While the present invention has been shown and described in connection with the exemplary embodiments, it will be apparent to those skilled in the art that modifications and variations can be made without departing from the spirit and scope of the invention as defined by the appended claims.

The invention claimed is:

1. A log-based traceback system using centroid decomposition technique, the system comprising:
   a log data input module collecting log data of an intrusion alarm from an intrusion detection system;
   a centroid node detection module generating a shortest path tree by applying a shortest path algorithm to network router connection information collected by a network administration server, detecting a centroid node by applying centroid decomposition technique removing a leaf-node to the shortest path tree, and generating a centroid tree whose node of each level is the detected centroid node; and
   a traceback processing module requesting log data of a router matched with the node of each level of the centroid tree, and tracing back a router identical to the log data of the collected intrusion alarm by comparing the log data of the router with the log data of the collected intrusion alarm as a router connected to a source of an attacker.

2. The system of claim 1, further comprising a router control module extracting log data of the router matched with the node of each level of the centroid tree by remote-controlling the router and transferring the extracted log data to the traceback processing module.

3. The system of claim 2, further comprising an MAC (media access control) address detection module detecting MAC addresses of hosts connected to the router connected to the source of the traced back attacker and transferring the detected MAC addresses to the traceback processing module.

4. The system of claim 3, wherein the traceback processing module extracts an attack pattern from the log data of the router connected to the source of the attacker, searches an MAC address identical to the extracted attack pattern, requests an IP address corresponding to the MAC address having the attack pattern, and traces the source of the attacker.

5. The system of claim 4, further comprising a traceback result database storing attack path information that is a result of tracing back the source of the attacker.

6. The system of claim 1, wherein the centroid tree has a high level centroid node that is one finally left after repeatedly removing a subordinate leaf-node of the shortest path tree and a plurality of low level centroid nodes, which are finally left after repeatedly removing a leaf-node from a plurality of trees obtained by removing the one finally left from the shortest path tree.

7. A method of generating a centroid tree by using centroid decomposition technique, the method comprising:
   collecting network router connection information from a network administration server;
   generating a shortest path tree by applying a shortest path algorithm to the collected network router connection information; and
   generating a centroid tree where a centroid node that is detected by applying centroid decomposition technique of removing a leaf-node of the shortest path tree becomes a node of each level.

8. The method of claim 7, wherein the generating a centroid tree comprises:
   removing a low level leaf-node of the shortest path tree;
   repeatedly removing a leaf-node from a tree formed of nodes left after the low level leaf-node until only one node is left;
   determining the one node as a high level centroid node;
   repeatedly removing a leaf-node from a plurality of trees obtained by removing the high level centroid node from the shortest path tree until only one node is finally left;
   determining a plurality of nodes finally left in the plurality of trees as low level centroid nodes; and
   generating a centroid tree where the high level centorid node is a root and the low level centroid node is a low level node.

9. A log-based traceback method using centroid decomposition technique, the method comprising:
   collecting log data of an intrusion alarm generated from an intrusion detection system and connection information of a network router where an attack packet pass through from a network administration server;
   generating a centroid tree where a centroid node that is detected by applying centroid decomposition technique of removing a leaf-node to the connection information of the network router where an attack packet passes through is a node for each level;
   comparing log data of the node for each level of the centroid tree with log data of the intrusion alarm collected from the intrusion detection system to search a router connected to a source of an attacker; and
   extracting an attack pattern from the log data of the router connected to the source of the attacker, searching an MAC address identical to the attack pattern, and tracing back the source of the attacker by requesting an IP address corresponding to the MAC address.

10. The method of claim 9, wherein the generating a centroid tree where a centroid node that is detected by applying centroid decomposition technique of removing a leaf-node to the connection information of the network router where an attack packet passes through is a node for each level comprises:
generating a shortest path tree by applying a shortest path algorithm to the connection information of the network router where the attack packet passes through; and
generating a centroid tree where a centroid node is detected by applying the centroid decomposition technique of removing the leaf-node of the shortest path tree is a node for each level.

11. The method of claim 10, wherein the generating a centroid tree where a centroid node is detected by applying the centroid decomposition technique of removing the leaf-node of the shortest path tree is a node for each level comprises:
removing a low level leaf-node from the shortest path tree;
repeatedly removing a leaf-node from the shortest path tree from which the low level leaf-node is removed, until only one node is left;
determining the only one node finally left as a high level centroid node;
repeatedly removing a leaf-node from a plurality of trees obtained by removing the high level centroid node from the shortest path tree until only one node is finally left;
determining a plurality of nodes finally left in the plurality of trees as low level centroid nodes; and
generating a centroid tree where the high level centorid node is a root and the low level centroid node is a low level node.

12. The method of claim 9, wherein comparing log data of the node for each level of the centroid tree with log data of the intrusion alarm collected from the intrusion detection system to search a router connected to a source of an attacker comprises:
querying log data of each node in an order of a high level of the centroid tree and from left to right in the same level and comparing the log data of the each node with log data of an intrusion path;
determining whether a node is a leaf-node or not, when there is the node with log data identical to the log data of the intrusion path as a result of the comparing; and
determining the node as the router connected to the source of the attacker when the node is the leaf-node as a result of the determining.

13. The method of claim 12, wherein, further comprising tracing back the router connected to the source of the attacker by searching whether a high level node is present, when the node is a root node and the log data thereof is not identical to the log data of the intrusion path as a result of the comparing.

14. The method of claim 12, further comprising determining a node with log data finally detected as the router connected to the source of the attacker, when the node is a low level node and the log data thereof is not identical to the log data of the intrusion path as a result of the comparing.

15. The method of claim 12, further comprising removing high level nodes of a node, which has identical log data but is not a leaf-node, from the centroid tree in the shortest path tree and returning to the comparing, when the node with the identical log data is not a leaf-node.

\* \* \* \* \*